March 12, 1940. T. B. TYLER 2,193,542
TRANSMISSION OPERATING MEANS
Original Filed June 1, 1932  2 Sheets-Sheet 1

INVENTOR
Tracy Brooks Tyler
BY
ATTORNEY

March 12, 1940.  T. B. TYLER  2,193,542

TRANSMISSION OPERATING MEANS

Original Filed June 1, 1932   2 Sheets—Sheet 2

Inventor
Tracy Brooks Tyler

Patented Mar. 12, 1940

2,193,542

UNITED STATES PATENT OFFICE 2,193,542

TRANSMISSION OPERATING MEANS

Tracy Brooks Tyler, Chicago, Ill.

Refile for abandoned application Serial No. 614,744, June 1, 1932. This application March 20, 1936, Serial No. 69,992

5 Claims. (Cl. 74—472)

The present application is a substitute for application Serial No. 614,744, filed June 1, 1932, which application was forfeited April 20, 1934, for failure to pay the final fee.

This invention relates to selection and shifting mechanism used in connection with the transmissions of motor vehicles and more particularly to means for operating a shifter member of the transmission. It constitutes an improvement over the device shown in my co-pending application now Patent No. 2,051,113, issued August 18, 1936.

The principal object of the present invention is to provide automatic selecting and non-automatic shifting means for automobile transmissions, the selection being automatic or controlled by the speed of the vehicle while the act of shifting preselected parts is non-automatic or personally controllable.

The object of the present invention as distinguished from those of my above mentioned patent is to provide a novel personally controllable means for operating the shifter member of a transmission shift mechanism, and for causing a preselected shift to be made. In the abovementioned patent the shifter member is shown as actuated for shifting by an operating means set in motion and controlled by the clutch pedal. In this application a shifter member is shown as actuated for shifting by means entirely independent of the clutch pedal, that is to say, by means connected to a manipulator pedal, which may be associated with or may even be, the throttle pedal of the vehicle. The advantages of such a construction will be more clearly brought out in the following detailed description of the preferred embodiment of the invention shown in the accompanying drawings in which:

Figure 1:
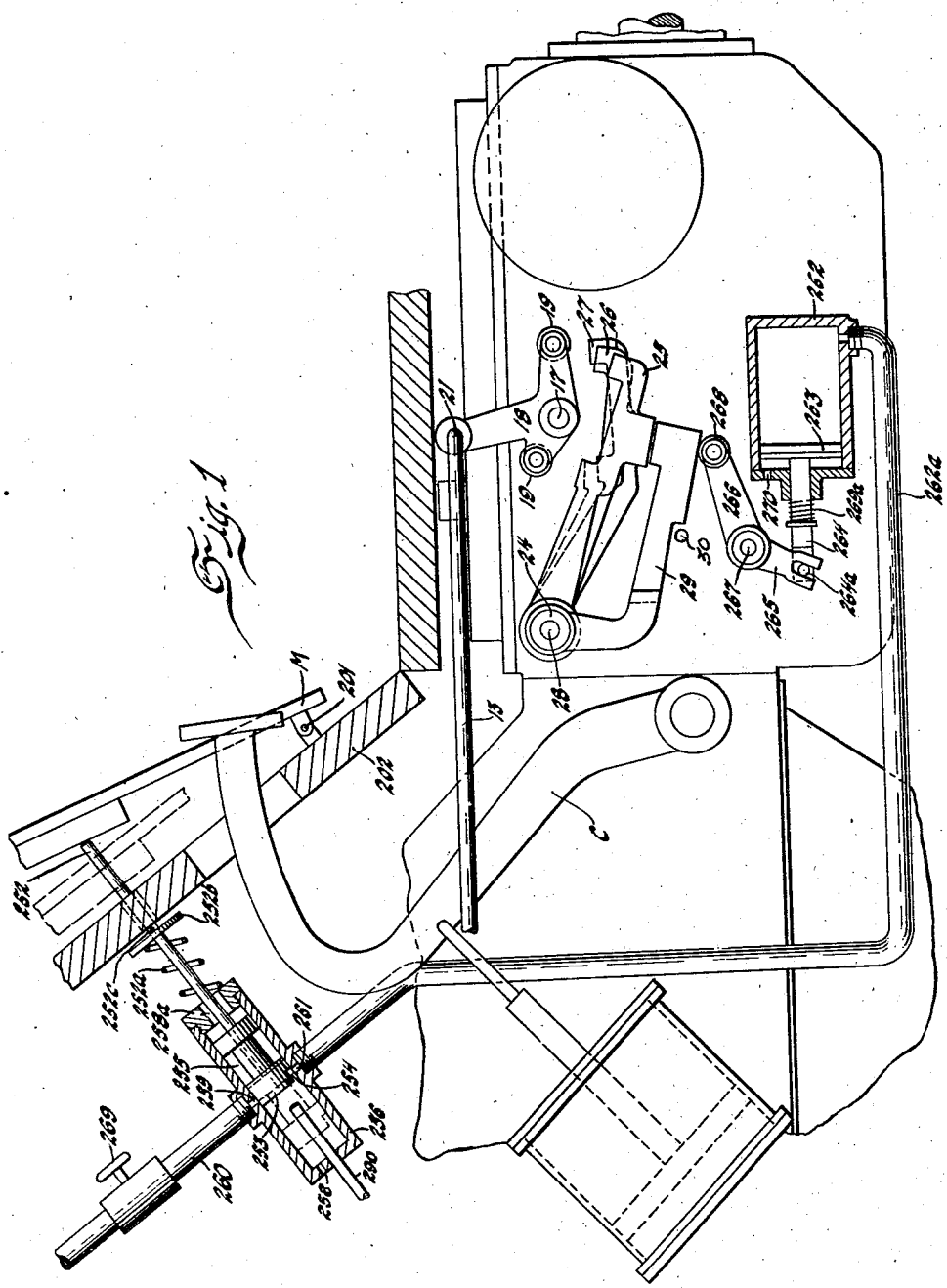
Fig. 1 shows parts of a selecting and shifting mechanism in elevation.

It is contemplated that an automobile equipped with the selecting and shifting mechanism here disclosed will have an engine shaft connected to a drive shaft by a clutch, the drive shaft being connected to a propeller shaft by a torque change transmission. The transmission has not been shown in detail because it forms no novel part of this invention and is already known to the art. It will be understood, however, that a slidable rail, shown on the drawings at 12, controls the act of shifting gears or in other words, the change of gear ratios. For an understanding of the present invention, therefore, it will be assumed that the slidable rail 12 is movable to three different positions and each of the positions of the rail 12 represents a different gear ratio in the transmission, and that the means to be described hereinafter for shifting the rail 12 to the three different positions, changes the transmission gear ratios in so doing.

The transmission parts may be selected and shifted, non-automatically and in conventional fashion by a shifting rod 13, actuated in turn by a shifting lever, not shown. The shifting rod 13, which is outside the transmission casing 14, is connected to the shifting rail 12 inside the casing by a gear sector 15 having teeth meshing with rack teeth on the shifting rail. The gear sector inside the casing is mounted on a stub shaft 17 projecting therefrom and a rocker arm 18 is fixed upon the stub shaft externally of the transmission casing. The shifting rod 13 is connected to the upper end of the rocker arm 18 at the connection 21 and it will be seen that the shifting rail 12 may be moved by the rod 13 through the rocker arm 18, stub-shaft 17 and gear sector 15. It will also be seen from that which follows that the shifting rail 12 may be moved for selection and shifting by means which engages the rocker arm 18 at its ends 19 and thus moves the stub shaft 17 and the gear sector 15.

Spaced from the stub shaft 17 and also projecting from the transmission casing is a tubular shaft 24 which serves as an axle for a plurality of shifting arms 25, 26 and 27. These arms correspond in number to the number of forwardly driving selection parts in the transmission, there being three only shown in the particular embodiment here illustrated, although it will be understood that any other number might well be used in connection with a transmission having more than three forward speeds. As may be seen in Fig. 1, the ends of the arms are formed with angular yokes which are adapted to engage the rollers 19 on the ends of the rocker arm 18 to rock the latter and thereby move the shifting rail. The angularity of the three yokes is different in each case so that engagement of the yokes with the rocker arm moves the latter to three different positions. Such movement of the rocker arm moves the sliding rail to the positions representing different gear ratios in the transmission. It will be seen upon reference to Fig. 2 that the rocker arm 18 is wide enough to encompass all of the yokes on the ends of the shifting arms, although only one of these shifting arms is brought into engagement with the rocker arm at any one time.

Figure 2:
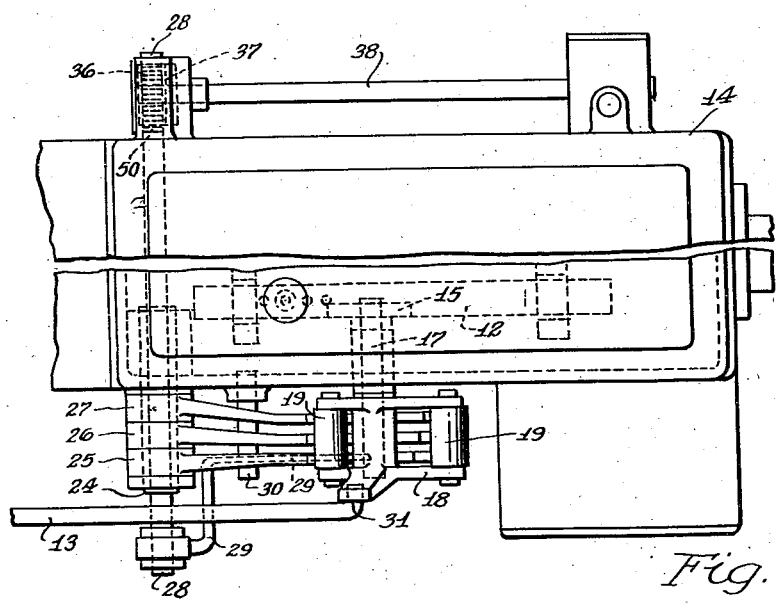
Fig. 2 shows certain of these parts in plan.

Projecting through the tubular shaft 24 and supported in the transmission casing thereby, as shown more clearly in Fig. 2, is a second shaft 28, which is slidable on its own axis. On the end of the shaft 24 which is adjacent to the arms 25, 26 and 27 is journaled a selector and shifter lever 29, the latter being L-shaped when viewed in elevation and ogee shape when viewed in plan. The selector and shifter lever when in its lowermost position rests upon a fixed stud 30 and its outer end may be brought into engagement with any one of the undersides of the shifting arms 25, 26 and 27 by swinging the same about the axis of the shaft 28.

The selector and shifter lever 29 is movable in two directions, and movement in these two directions performs different functions. The lever 29 along with the shaft 26 may be moved horizontally by means operatively connected to the propeller shaft, to positions under one or another of the shifting arms, the amount of horizontal movement and therefore its position with respect to these arms being automatically determined and controlled by the speed of the propeller shaft in a manner to be described. The lever 29 may be moved upwardly non-automatically, by personally controlled means to cause one or another of the shifting arms to engage the rocker arm and thereby to move the shifting rail 12. The horizontal movement of the lever 29 controls the selection, that is to say, it will determine which of the shifting arms will be moved and which of the elements of the transmission will be selected. The vertical movement of the lever 29 controls the act of shifting, that is to say, when moved upwardly the lever 29 will cause the pre-selected shift to be made.

The means for selecting, or in other words for moving selector 29 horizontally and positioning it under one or another of the shifting arms and for co-relating such selection with the speed of the propeller shaft so as to form an automatic selecting mechanism, includes the elongated shaft 28 upon which the lever 29 is supported. This shaft is slidable in the transmission casing to a limited extent and has rack teeth 36 at its end which is opposite to the end upon which the lever 29 is mounted. The rack teeth 36 mesh with a pinion gear 37 on the end of a control shaft 38, the latter having a second pinion 39 meshing with rack teeth formed on a slidable sleeve 40, the latter being connected to the end of a control actuator shaft 41 whose axial sliding movement is determined by the speed of a propeller shaft 42.

Figure 3:
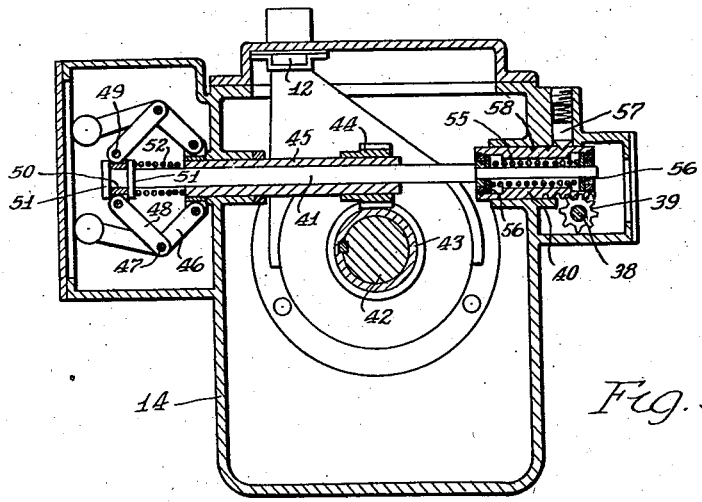
Fig. 3 is a section illustrating propeller shaft controlled means forming part of the automatic selecting mechanism.

The propeller shaft is provided with a gear 43 meshing with a pinion 44 fixed to a non-slidable sleeve 45 journalling and rotating on the shaft 41. To one end of the sleeve 45 are pivotally connected the weighted arms 46 of a centrifugal governor, these arms in turn being pivotally connected at 47 to links 48 which in turn are pivotally connected at 49 to a collar 50 rotatable on the shaft 41, the collar being restrained against sliding movement by fixed collars 51 on the shaft 41. A spring 52 tends to move the shaft 41 to the left as shown in Fig. 3, counteracting that influence of the arms 46 which upon rotation thereof tends to move the shaft 41 to the right as viewed in Fig. 3.

As the propeller shaft rotates it causes rotation of the weighted arms 46 and the position assumed by these arms varies with the speed of the propeller shaft. As the governor arms move away from the shaft 41 they cause the latter to slide in its bearings until the compression springs 55, telescoped between the shaft 41 and the sleeve 40 is compressed sufficiently to permit the washers 56 to engage shoulders within the sleeves 40, whereupon the sleeve will move with the shaft 41, against the restraining influence of the spring pressed check plunger 57, adapted to seat in one or another of the spaced notches 58 of the sleeve. This construction is provided so that the sleeve 40 will not move gradually in response to slight variations in speed of the propeller shaft 42, but will move with a snap action distances equal to the spacing of the notches 58. The movement of the sleeve 40 acting through the control shaft 38 and shaft 28 will cause snap movement of the lever 29 to positions under the shifting arms 25, 26 and 27. The restraining plunger 57 and the notches 58 are spaced to correspond to the spacing of the shifting arms and ensure the lever 29 being moved into complete alinement with one or another of the shifting arms, and not under two of them at one time.

The parts described immediately above constitute means for automatically determining selection and automatically co-relating selection to the speed of the propeller shaft. Other parts constitute means for actuating the shifting part or rail and for non-automatically shifting automatically preselected elements in the transmission. The non-automatic means which forms the novel part of this invention as distinguished from the disclosure in Patent No. 2,051,113, will now be described.

The manipulator pedal M which is pivotally mounted at 201 on floorboard 202 is shown as engaging a valve rod 252, the latter being normally pressed outwardly by a spring 252a engaging a washer 252b held in place by a pin 252c on the valve rod. The valve rod 252 at its end is provided with a plunger valve 253 having a relief 254, and an annular groove 255. The plunger is slidable in a valve cylinder 256 fixedly mounted under the floorboard and against which abuts the spring 252a. This cylinder is open to the atmosphere through ports 258 and 258a and the valve rod enters the cylinder through the last mentioned port. The cylinder further has a port 259, connected by a conduit 260 to the suction-producing intake manifold of the engine or other suction source, and also has a port 261 connected to a second cylinder 262 by a pipe or tube 262a.

The cylinder 262 has a piston 263 whose rod 264 is connected by a pin 264a to the forked end 265 of a bell crank 266, the latter being pivoted at 267 to the transmission casing and having a roller end 268 corresponding to the roller end 68 of the bell crank 67, of the above numbered application.

The conduit 260 has a manually operable shut-off cock 269 mounted so as to be readily accessible to the operator of the vehicle. When the cock is shut off the suction operated means is inoperable and shifting of the parts in the transmission cannot be accomplished through movement of the manipulator pedal M.

When the cock 269 is open, however, and the manipulator pedal is released fully, as shown, the valve 253 will be at its extreme outward position, as shown. The cylinder 262 will have been vented through tube 262a and port 261, relief 254, and port 258, and the piston 263 will have been moved to the left, as shown, being thus biased by the spring 269a on piston rod 264. The member 29 and 266 will be down at that time.

When a not previously existent driving relation is to be established in the transmission, the operator will press down on pedal M, whereupon the latter moves the valve 253 downward and to the left, so that relief 254 will no longer be aligned with port 261. The relieving of cylinder 262 is thus cut off. Further movement of valve 253 to the left will align its annular groove 255 with ports 259, 261 opening the suction line to cylinder 262, permitting atmospheric pressure at port 270 to move piston 263 to the right from the position shown whereupon member 29 will be moved upwardly to create a driving relation corresponding to the arms 25, 26, 27 under which the member 29 happens to have been positioned.

Continued movement of the valve 253 downwardly and to the left by manipulator pedal M does not cut off the suction at 259 since the annular groove 255 is of such length that when the valve 253 is in full-pedal advance position, its right hand flange is just clear of ports 259 and 261.

When pedal M is all the way down, or when it is being returned, and until the very end of such return stroke, annular groove 255 keeps line 262a open to suction, so that the shifter 29 will be up, at all times, or will be moved up, for shift, if it had not been moved up previously on pedal advance stroke.

It will also be observed that the act of shifting preselected parts in the transmission is accomplished through movements of a manipulator pedal M which, as described above may be associated with or may actually be the throttle pedal. The act of shifting is thus made entirely independent of clutch action, and it will be seen that though a clutch pedal, reference C, is shown, the same takes absolutely no part in the act of shifting preselected parts of the transmission. Though it will of course be understood that a shift cannot properly occur without the clutch having been disengaged.

It will further be observed that the act of shifting, in the mechanism disclosed in this application, takes place as soon as and continuously after the operator advances the manipulator pedal M.

Further, if the advance movement of manipulator M is associated with engine acceleration, and return movement is associated with engine deceleration, then the act of shifting will take place on engine acceleration, or thereafter, and after the act of shifting is effected, no movement of shifter 29 is possible until a deceleration and acceleration cycle is completed.

In order to associate manipulator pedal M with engine throttling action, if pedal M is not actually the throttle pedal, pedal M might be made U-shaped with the throttle pedal nested therein, substantially as shown in my copending application, Serial No. 614,946, filed June 2, 1932. So constructed, the act of shifting will be associated with throttle opening.

If pedal M is the throttle pedal, as will often be the case, then the throttle control rod, referenced 290, may be projected into cylinder 256, to slide therein, the rod end being spaced from valve 253 when the latter is in the full throttle closed position shown. Under such circumstances, depression of pedal M will first move valve 253 for shifting and will then cause movement of the throttle control rod 290.

Now having described the invention, and a preferred embodiment of the same, it will be understood that the scope of the same is to be determined not by the foregoing detailed description but by the claims which follow.

What I claim is:

1. In a selector and shifter mechanism for the transmission of a motor vehicle, and in combination with a personally operable manipulator whose advance movement is associated with engine acceleration and whose return movement is associated with engine deceleration, a plurality of elements adapted to be moved to cause different speed shifts in the transmission, a speed responsive selector adapted to be moved into operative relationship with said elements individually, and means connecting said manipulator with said selector whereby advance movement of said manipulator operates said selector to cause shift movement of one of said plurality of elements for effecting a preselected shift.

2. In a selector and shifter mechanism for the transmission of a motor vehicle, and in combination with a personally operable manipulator whose advance movement is associated with engine acceleration and whose return movement is associated with engine deceleration, a plurality of elements adapted to be moved to cause different speed shifts in the transmission, a speed responsive selector adapted to be moved into operative relationship with said elements individually, and fluid pressure means connecting said manipulator with said selector whereby advance movement of said manipulator operates said selector to cause shift movement of one of said plurality of elements for effecting a preselected shift.

3. In a selector and shifter mechanism for the transmission of a motor vehicle, and in combination with a personally operable pedal, a plurality of elements adapted by movement thereof to cause change speed shifts, a speed responsive shifter part adapted by movement thereof to cause movement of said plurality of elements individually, fluid pressure means for moving said shifter part, a valve controlling said fluid pressure means, and a connection between said valve and said pedal whereby movement of said pedal operates said valve to actuate said fluid pressure means, said valve being adapted to be in operative position during all stages of movement of said pedal other than full retard.

4. In a selector and shifter mechanism for the transmission of a motor vehicle, and in combination with a personally operable pedal, a shifter part adapted by movement thereof in one direction to select a shift and in another direction to effect a predetermined shift, said shifter part being adapted for movement by speed responsive means to select a shift, pressure responsive means for moving said shifter part to effect a selected shift, a valve controlling said pressure responsive means, a connector attached to said valve and adapted to have its other end attached to a carbureter, and a connection between said valve and said pedal whereby movement of said pedal operates said valve to cause actuation of said pressure responsive means and simultaneous movement of said connector, said valve being adapted to be in operative position during all stages of movement of said pedal other than full retard.

5. In a selector and shifter mechanism for the transmission of a motor vehicle, and in combination with a personally operable pedal, a shifter part adapted by movement thereof in one direction to select a shift and in another direction to effect a predetermined shift, said shifter part being adapted for movement by speed responsive means to select a shift, suction operated means connected to said shifter part and adapted to move the same to effect a selected shift, a line connected to said suction operated means and adapted to be connected to a source of suction, a valve mounted in said line, and a connection between said valve and said pedal whereby movement of said pedal opens said valve, said valve being adapted to remain open during all stages of movement of said pedal other than full retard.

TRACY BROOKS TYLER.